United States Patent
Beckett et al.

[11] Patent Number: 5,879,731
[45] Date of Patent: Mar. 9, 1999

[54] SHAPED CHOCOLATE IN CONFECTIONERY

[75] Inventors: Stephen Thomas Beckett, Wiggington; Mark Jury, Thirsk, both of England

[73] Assignee: Nestec S.A., Vevy, Sweden

[21] Appl. No.: 741,211

[22] Filed: Oct. 29, 1996

[30] Foreign Application Priority Data

Oct. 31, 1995 [GB] United Kingdom .................... 9522263
Jul. 23, 1996 [GB] United Kingdom .................... 9615406

[51] Int. Cl.⁶ ....................................................... A23G 9/00
[52] U.S. Cl. .......................... 426/101; 426/103; 426/104; 426/289; 426/565; 426/572; 426/660; 426/383; 426/519
[58] Field of Search ..................................... 426/101, 103, 426/249, 289, 565, 571, 572, 659, 660, 383, 519, 516, 104

[56] References Cited

U.S. PATENT DOCUMENTS

| | | | |
|---|---|---|---|
| 615,191 | 11/1898 | Lembke | 426/103 X |
| 787,887 | 4/1905 | Baker | 426/101 |
| 1,649,307 | 11/1927 | Hunter | 426/516 |
| 1,890,044 | 12/1932 | Policastro et al. | 426/101 X |
| 1,913,851 | 6/1933 | Oprean | 426/101 X |
| 2,288,970 | 7/1942 | Weisbender | 426/101 X |
| 3,093,093 | 6/1963 | Ryan et al. | 426/383 X |
| 4,353,927 | 10/1982 | Lovercheck | 426/249 X |
| 5,439,695 | 8/1995 | Mackey | 426/516 |

FOREIGN PATENT DOCUMENTS

2497728  7/1982  France .

OTHER PUBLICATIONS

Beckett, S.T. et al., "The Cold Extrusion of Chocolate", Food and Bioproducts Processing, Translation of The Institure of Chemical Engineers, Part C, vol. 72, No. C1, pp. 47–54, Mar. 1994.

*Primary Examiner*—Milton Cano
*Attorney, Agent, or Firm*—Vogt & O'Donnell, LLP

[57] ABSTRACT

A confectionery product which has discrete pieces of a chocolate material, which is a chocolate, a chocolate substitute or a chocolate analogue, having specific characteristic shapes which are images dispersed in a confectionery material is prepared by distributing the discrete pieces having a temperature less than 20° C. into a stream of frozen, chilled or ambient confectionery material to obtain a composite product, and the composite product may be mixed.

13 Claims, No Drawings

SHAPED CHOCOLATE IN CONFECTIONERY

BACKGROUND OF THE INVENTION

The present invention relates to confectionery products and in particular to frozen, chilled or ambient confectionery products wherein a confectionery material, including such as an ice cream, contains pieces of chocolate or other fat-containing confectionery material dispersed therein.

Ice cream products are known which have dispersed therein ingredients such as nuts, raisins, seeds, fruits, coconut flake, miniature marshmallows, candies or chocolate chips in order to impart certain specific organoleptic characteristics. Such ingredients can be inserted in a controlled manner into a flowing stream of ice cream by means of standard ingredient feeders commonly used in the ice cream industry. One kind of ingredient feeder is a continuous ingredient feeder manufactured by APV, Model S-420, in which positive, accurate metering is accomplished by means of an agitator and auger feed combination which transfers the ingredients from the main hopper, usually at room temperature, onto an enrobing rotor at a controlled rate of speed. The controlled speed and smooth action of the agitator and auger assure gentle handling without damage to the ingredients. This works very well for the sturdy ingredients such as nuts and seeds and for the more flexible products such as raisins and miniature marshmallows. With regard to chocolate chips, which do not have any particular recognizable shape and consist of particles whose maximum dimensions are generally less than 5 mm, usually from 1–3 mm, the actual shape of the chips is of little significance, the desired effect of the presence of chocolate chips in ice cream being almost entirely organoleptic.

However, there has been a desire to have a novelty product, particularly one with a visual appearance which adds to the interest and amusement of children, comprising ice cream in which are dispersed discrete pieces of shaped chocolate or a fat-containing confectionery material having specific characteristic shapes, e.g. images of cartoon animals, dinosaurs, stars, letters of the alphabet, etc. Due to their relatively small size, many of these shapes or parts thereof may be rather delicate, and clearly, in order to maintain their novelty value, it is important that any damage or breakage during production and storage is minimized, and up until now, it has not been possible to distribute shaped products into ice cream economically.

Although it is possible to produce shaped chocolate or fat-containing confectionery pieces by traditional forming methods such as roller forming or liquid-state moulding, these methods are costly in operation and the investment required to produce a different shape is large due to the need for new sets of moulds or forming rollers.

European Patent Application Publication No. 0 603 467 (hereinafter "EP-A-0603467"), the contents of which are hereby incorporated into the present specification, a process is described for the cold extrusion of chocolate, which process enables the cost-effective production of large quantities of extruded, shaped chocolate pieces for incorporation into confectionery products. Since a new shape only requires investment in a new die (or dies) the relative cost of changing to a different shape is very low compared to other methods. This process therefore gives an economically viable method to produce large quantities of shaped chocolate or fat-containing confectionery pieces.

Furthermore, the production of very small shaped pieces by traditional moulding techniques, is not reliable in view of the difficulty in controlling deposit shot weight as well as accuracy of positioning of the mould and demoulding of the final product. The cold extrusion process of EP-A0603467, however enables shapes with very high definition two dimensional outlines to be produced.

Moreover, roller forming techniques inevitably results in a web of chocolate between the shapes emanating from the gap between the rollers, this web is difficult to remove from complex shapes and would therefore reduce the shape definition of the final product. In the cold extrusion process of EP-A-0603467, however no such webbing exists.

SUMMARY OF THE INVENTION

Although the presence in ice cream of discrete pieces of shaped chocolate or a fat-containing confectionery material having specific characteristic shapes is important for the organoleptic characteristics, a major object of their presence, in contrast to normal chocolate chips, is their visual effect. Therefore any breakage or damage to these specific characteristic shapes will impair the visual appearance, and in this invention, "shaped" chocolate or fat-containing confectionery material should be understood to refer to a chocolate or fat-containing material having a shape determined by an extrusion die, or by other moulding means such as forming rollers, a tablet press, or traditional moulding methods, etc., or also by injection moulding as described in EP-A-0603467.

Accordingly, the present invention provides a process for the production of a confectionery product comprising a frozen, chilled or ambient confectionery material (i.e., material having "a temperature no more than ambient") having dispersed therein or distributed thereon discrete pieces of shaped chocolate or fat-containing confectionery material having specific characteristic shapes which are images wherein the process comprises inserting and/or distributing pieces of a chocolate or a fat-containing confectionery material having specific characteristic shapes, which are images, into and/or onto a confectionery material which is frozen or chilled or at ambient conditions to obtain the product.

Additionally, we have found, surprisingly, that by reducing the temperature of the discrete pieces of shaped chocolate or a fat-containing confectionery material to below ambient temperature, e.g. below about 20° C., and especially below 15° C., such pieces can be inserted into ice cream using standard equipment without substantial breakage or damage.

Also according to the present invention there is provided a confectionery product comprising a frozen, chilled or ambient confectionery material having dispersed therein or distributed thereon discrete pieces of shaped chocolate or a fat-containing confectionery material having specific characteristic shapes which, as above, are images.

DETAILED DESCRIPTION OF THE INVENTION

Examples of frozen confectionery materials include ice cream, sorbet, frozen yoghurt, or low-fat frozen desserts, etc. Examples of chilled confectionery materials include mousses, yoghurts, custards, or jellies, etc. Examples of ambient confectionery materials include fondant, mousse, praline, marshmallow, nougat, or flour confectionery such as cakes and cookies. The ice cream may be hard or soft ice cream, and may have any desired flavour, e.g. vanilla, peppermint, strawberry, raspberry, etc. One advantage of using a softer ice cream is that the visible discrete pieces of shaped chocolate or fat-containing confectionery material are less likely to be broken during scooping. Another advantage is that the discrete pieces of shaped chocolate or fat-containing confectionery material buried within the ice cream bulk are able to move without breaking, thus revealing their full shape, which is not visible in the undisturbed bulk material. The discrete pieces of shaped chocolate or fat-containing confectionery material which are buried within the ice cream bulk may be the same or different from the visible discrete pieces.

The specific characteristic shapes of the discrete pieces of shaped chocolate or a fat-containing confectionery material may be images of cartoon characters, animals, stars, numbers or letters of the alphabet. Examples of cartoon characters MICKEY MOUSE, DONALD DUCK and MISS PIGGY characters, etc., and examples of animals are dinosaurs. The specific characteristic shapes of the discrete pieces in the confectionery product may be of the same or different shapes, colours or flavours. Other ingredients such as nuts, raisins, normal chocolate chips or caramel pieces may be present in addition to the discrete pieces of shaped chocolate or fat-containing confectionery material.

The size of the discrete pieces of shaped chocolate may vary and is such that the maximum dimension is not usually greater than 5 cm, preferably not greater than 3 cm and more referably not greater than 2 cm. The volume of each discrete piece of shaped chocolate may be from 5 to 10,000 $mm^3$, preferably from 10 to 2000 $mm^3$ and more preferably from 15 to 500 $mm^3$.

The discrete pieces of shaped chocolate or a fat-containing confectionery material may be produced by techniques such as injection or compression moulding, tablet pressing, by more traditional moulding methods, by roller forming, or by extrusion. The extrusion process is preferably the cold extrusion process described in the afore-mentioned EP-A-0603467 in which the material is extruded in a solid or semi-solid non-pourable or non-flowable form to produce an extruded solid or semi-solid non-pourable or non-flowable product having a temporary flexibility or plasticity, which product can be injection moulded under pressure at a temperature below the normal melting point of the chocolate or of a fat-containing confectionery material.

As described in EP-A-0603467, the process comprises feeding a fat-containing confectionery material into an extruder and applying pressure to the fat-containing confectionery material in a substantially solid or semi-solid non-pourable form upstream of a flow constriction at a temperature at which the fat-containing confectionery material is extruded substantially isothermally and remains in a solid or semi-solid non-pourable form to produce an axially homogeneous extruded product having a cross-section which is of substantially a same profile as the die exit of the extruder.

As set forth EP-A-0603467, "substantially isothermally" means that the temperature of the fat-containing confectionery material remains substantially unchanged under the conditions of the extrusion from the input to the outlet of the flow constriction if there is no external heating or cooling means. The use of external heating or cooling means, however, is not excluded as long as the material being extruded remains in a substantially solid or semi-solid non-pourable state throughout the extrusion from the input to the outlet of the flow constriction. In other words, the temperature of the fat-containing confectionery material is not caused to increase substantially by the extrusion process itself. The physical state of the fat-containing confectionery material is such that its general deformation behavior during extrusion is of plastic nature rather than that of a viscous fluid. Additionally, an important feature of the extrusion process is that for a given die configuration and material composition, the extrusion rate is weakly dependent upon the extrusion pressure.

The flow constriction may be any narrowing of the cross-sectional area of a conduit but it is usually a die, and extrusion can be generated by a differential pressure across the flow constriction. This may be established, for example, by a ram extruder conveniently operating at a controlled rate or pressure. The extruder may be, for example, a DAVENPORT extruder, a constant pressure extruder, a single-screw extruder, a twin-screw extruder or CONFORM machine.

The extrusion process necessarily includes a form of deformation between the input and outlet of the extrusion system. The convergence or contraction ratio into any extrusion orifice is preferably greater than 1.5 where the convergence or contraction ratio is defined as the ratio of the inlet area to the minimum cross-sectional area of the die for a simple cylindrical extrusion geometry.

During extrusion, it is important that the fat-containing confectionery material does not become pourable and the extrusion temperature and pressure should be maintained below a level where this may happen. Thus, although, the fat-containing confectionery material may be fed into the barrel of the extruder in the liquid or paste form, it preferably is fed into the barrel in the solid or semi-solid form, and the material is, however, extruded in a solid or semi-solid non-pourable form. The fat-containing confectionery material may be in a granular or continuous form. When in granular form, the granular nature of the fat-containing confectionery material appears to be lost during extrusion to give an essentially uniform material.

In the present invention, the chocolate material may be dark, milk or white chocolate. Fat-containing confectionery materials may include sugar, milk derived components, and fat and solids from vegetable or cocoa sources in differing proportions having a moisture content less than 10%, more usually less than 5% by weight. They may be chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or CARAMAC sold by Nestlé comprising non-cocoa butter fats, sugar and milk. Colourings and/or flavourings, as are well known in the art, may be added to any of the above materials. Since the fat-containing confectionery material contains less than 10% water, flour confectionery products such as cakes and pastries are excluded from the discrete pieces of shaped material but, however, are not excluded from the confectionery material containing the discrete pieces of shaped material.

The number or proportion of discrete pieces of shaped material in and/or on the confectionery product may be chosen as desired both for the visual and/or organoleptic effect. The proportion of the discrete pieces in the confectionery product may be up to 100 g or more per 100 ml of confectionery product, such as from 1 to 50g and conveniently from 2 g to 20 g per 100 ml of confectionery product.

In carrying out the process of the present invention, for example, when ice cream is the confectionery material, the discrete pieces of shaped chocolate are conveniently inserted into a flowing stream of the ice cream, by using a standard ingredient feeder commonly used in the ice cream industry such as a continuous ingredient feeder manufactured by APV, Model S-420 in which positive, accurate metering is accomplished by means of an agitator and auger feed combination which transfers the discrete pieces from the main hopper onto an enrobing rotor at a controlled rate of speed.

The temperature of the discrete pieces of shaped chocolate or a fat-containing confectionery material having specific characteristic shapes as they are inserted into and/or distributed onto the confectionery material depends on a variety of factors, the major ones being the temperature and viscosity of the bulk material and particularly the mixing methods used. For example, chocolate in the solid state may be added to yoghurt at ambient temperature. For ice cream, the temperature of the discrete pieces of shaped chocolate or fat-containing material added is preferably below +20° C., more preferably from −20° C. to +15° C., even more preferably from −5° C. to +10° C. and especially from 0° C. to +60° C.

The present invention is further illustrated by the following Example.

EXAMPLE

Discrete pieces of shaped chocolate having the shapes of 10 mm diameter 5-pointed stars, produced on a MANU-MOLD Injection Moulding machine provided with a modified barrel to carry an extrusion die, according to the process described in EP-A-0603467 at +25° C. and 80 bars pressure and cut to 2 mm width, are fed from a hopper at +5° C. into the agitator and auger feed combination of a continuous ingredient feeder manufactured by APV, Model S-420 through which they are transported and metered at a controlled rate of speed onto an enrobing rotor where they are inserted into a flowing stream of soft ice cream and then mixed in a low shear blender to produce an ice cream product containing 10 g per 100 ml of the ice cream of discrete pieces.

We claim:

1. A process for preparing a confectionery product comprising distributing pieces of a chocolate material which are images and which have a temperature less than 15° C. into a stream of a confectionery material selected from the group consisting of frozen and chilled confectionery material to obtain a composite product in which the image pieces are dispersed in the confectionery material so that the composite product comprises the images buried in the confectionery material and wherein the chocolate material is selected from the group consisting of a chocolate, of a chocolate substitute comprising a cocoa butter replacement and of a chocolate analogue comprising a cocoa butter replacement.

2. A process according to claim 1 further comprising mixing the composite product to obtain a mixed product wherein the images are buried in the confectionery material.

3. A process according to claim 2 wherein the pieces have a temperature of from −5° C. to +10° C.

4. A process according to claim 3 wherein the confectionery material is selected from the group consisting of ice cream, sorbet and frozen yoghurt.

5. A process according to claim 2 wherein the confectionery material is ice cream.

6. A process according to claim 1 wherein the temperature of less than 15° C. extends in a range to −20° C.

7. A process according to claim 1 wherein the confectionery material is selected from the group consisting of chilled mousse, chilled yoghurt, chilled custard and chilled jelly.

8. A process according to claim 1 wherein the confectionery material is ice cream.

9. A process according to claim 1 wherein the images are selected from the group consisting of cartoon characters, animals, stars, letters of the alphabet and numbers.

10. A process according to claim 1 wherein the distributing of the pieces comprises passing the pieces at a controlled rate via an agitator and auger feed combination to an enrobing rotor to meter the pieces into the stream.

11. A process according to claim 1 wherein the pieces are distributed into the confectionery material stream so that the composite product has from 1 g to 50 g of the pieces per 100 ml of the composite product.

12. A process according to claim 1 wherein the pieces have a dimension not greater than 5 cm and individually have a volume of from 5 mm$^3$ to 10,000 mm$^3$.

13. A process according to claim 1 further comprising feeding a particulate substance, wherein the substance is selected from the group consisting of a chocolate, of a chocolate substitute comprising a cocoa butter replacement and of a chocolate analogue comprising a cocoa butter replacement, into an extruder and applying pressure to the substance to pass the substance through the extruder and to and through an extruder die to obtain an extrudate from the die, wherein the substance passed through the extruder and the extrudate from the die are at a temperature so that the substance and extrudate are in a non-pourable state for preparing the pieces.

* * * * *